Patented Aug. 18, 1953

2,649,467

UNITED STATES PATENT OFFICE 2,649,467

METHOD OF SEPARATING ORGANIC COMPOUNDS OF HIGH HYDROGEN CONTENT FROM THOSE OF LOW HYDROGEN CONTENT

Ben Braae, Stockholm, Sweden, assignor to Aktiebolaget Seperator-Nobel, Stockholm, Sweden, a corporation of Sweden No Drawing. Application March 30, 1950, Serial No. 152,996. In Sweden April 5, 1949

2 Claims. (Cl. 260—428.5)

Among the methods used in fractionating certain fluid organic compounds, the extraction process with selective solvents is one of the most important. The extraction is effected by treating the initial product with a solvent with which it is not entirely miscible within a certain temperature range. The mixture therefore forms two layers which, after separation and removal of the solvent by distillation, have different properties compared with one another and with the initial product. This procedure is largely used in the commercial refining of mineral oils and fatty oils.

In selective extraction, it is of course attempted to effect as complete fractionating as possible of the components contained in the raw material. In practice, however, it is possible to obtain good fractionating only by a treatment in several stages, because a part of those components of the mixture which are relatively difficult to dissolve follow the solvent phase. This is specially the case in the extraction of mineral oils and fatty oils containing a plurality of closely related substances with relatively small solubility differentials. The multi-stage extraction is preferably carried out as a counter-current process. The mixture is thereby separated into two fractions, the raffinate phase, which contains the components which are relatively difficult to dissolve in the solvent and some of the solvent, and the extract phase, which contains the most readily soluble components and the majority of the solvent.

A great number of solvents are used, or have been proposed, for the selective extraction of oils. For example, furfural, phenol, cresol, nitrobenzene, sym. β-dichlor ethyl ether, aniline, and fluid sulphur dioxide are used in the refining of mineral oils; and furfural, acetone, nitroethane, propionitrile, acetoacetic ester, etc., are used in the fractionating of fatty oils.

The properties of the extract and of the raffinate depend upon the kind of solvent used and the conditions of operation, but also on the chemical character of the raw material. In many cases the chemical composition of the final products is of less interest than their chemical or physical specifications, because experience has shown that there is a relation between these specifications and the commercial value of the products. As a typical example, the selective solvent extraction of mineral oils may be mentioned. It is well-known that mineral oils consist of very complicated mixtures of hydrocarbons in which, as a rule, all hydrocarbon types (paraffins, olefines, naphthenes, and aromatics) are represented, together with small amounts of oxygen-, nitrogen- or sulphur-containing compounds. A complete chemical analysis of these mixtures can be made only in exceptional cases, but the extraction process can be closely followed by determining the hydrogen content, specific gravity, refractive index, dispersion, iodine number, viscosity, viscosity index, or other readily accessible factors. There exists a certain parallel between the chemical character of the investigated oil fractions and the properties determined by analysis. A so-called paraffinic oil, for example, has a high hydrogen content and high viscosity index, but low specific gravity, refractive index and dispersion, whereas an asphalt base oil has a low hydrogen content, and low viscosity index but high specific gravity, refractive index and dispersion. The naphthenic oils occupy a position between these two products. Although the various solvents used for selective extraction of mineral oils have varying selectivity and dissolving power, experience shows that all solvents heretofore known cause a concentration of the components with relatively high hydrogen content in the raffinate phase and of those with relatively low hydrogen in the extract phase.

Quite analogous conditions obtain in the extraction of fatty oils, consisting of mixtures of various fatty acid glycerides which contain both saturated and unsaturated fatty acids. The extracts in this case consist chiefly of the most unsaturated glycerides, that is, the components poorest in hydrogen, whereas the glycerides richer in hydrogen are concentrated in the raffinate. Also, in the extraction of free fatty acids or their esters with other alcohols, extracts relatively poor in hydrogen and raffinates relatively rich in hydrogen are obtained.

I have found that a new group of solvents, perfluorinated hydrocarbons, extract mainly the components relatively rich in hydrogen from the organic mixtures and leave the components poorest in hydrogen in the raffinate phase, in contrast to the heretofore known solvents. By perfluorinated hydrocarbons is meant hydrocarbons in which all hydrogen atoms are replaced by fluorine. In Table I, some perfluorinated hydrocarbons and their physical properties are given.

By the use of per-fluorinated hydrocarbons for selective extraction considerable technical advantages may be obtained. The economy of the extraction procedure is largely dependent upon the relation between the amount of raffinate and of extract. When the raffinate constitutes the main product, relatively small amounts of solvent suffice to remove the extract. On the other hand, when the extract is the main product, large amounts of solvent are needed, and the economy is rapidly impaired with increasing amounts of extract.

in view of the selectivity of the solvent and its dissolving power for the initial material.

Selective extraction with perfluorinated hydrocarbons can be used in many commercial fractionating processes. For example, small amounts of saturated compounds may be extracted from petroleum naphthas of mainly aromatic character, which results in a considerable improvement of the octane number of the raffinate benzine; and from such mineral oil distillates, which may be used for fuelling diesel engines, fractions with improved cetane number may also be obtained.

Although lubricating oils having a high viscosity index can usually be obtained from most mineral oils by the conventional extraction process with furfural or other known solvents, it may be economically advantageous, when using as

TABLE I

*Physical data of some important perfluorinated hydrocarbons*

| Formula | Name | M. P., °C | B. P., °C | Spec. grav. | Refractive index |
|---|---|---|---|---|---|
| $CF_4$ | Perfluoro methane | −184 | −128 | 1.96 (−184°) | |
| $C_2F_6$ | Perfluoro ethane | −100.6 | −78.2 | 1.85 (−78°) | |
| $C_3F_8$ | Perfluoro propane | −183 | −38 | 1.45 (−38°) | |
| $C_4F_{10}$ | Perfluoro-n-butane | | −4.7 | | |
| $C_4F_{10}$ | Perfluoro-isobutane | | +3.0 | | |
| $C_5F_{12}$ | Perfluoro-pentane | | 29.4 | | |
| $C_6F_{14}$ | Perfluoro hexane | | 58 | | |
| $C_7F_{16}$ | Perfluoro heptane | | 82 | 1.7038 (30) | 1.2512 (30) |
| $C_7F_{16}$ | Perfluoro-2,2,3-trimethyl butane | | 104 | 1.8002 (30) | 1.2733 (30) |
| $C_{16}F_{24}$ | Perfluoro hexa-decane | +115 | +240 | | |
| $C_5F_{10}$ | Perfluoro cyclopentane | −12 | 22 | 1.64 (30) | 1.24 (30) |
| $C_6F_{12}$ | Perfluoro cyclohexane | 50 | 52 | 1.684 (30) | 1.2685 (30) |
| $C_7F_{14}$ | Perfluoro methyl cyclohexane[1] | | 76 | 1.7779 (30) | 1.2762 (30) |
| $C_8F_{16}$ | Perfluoro dimethyl cyclohexane | | 100 | 1.8270 (30) | 1.2930 (30) |
| $C_9F_{18}$ | Perfluoro-1,3,5-trimethyl-cyclohexane | | 123 | 1.8676 (30) | 1.2936 (30) |
| $C_6F_6$ | Perfluoro benzene | −12 | [2] 82 | 1.612 | 1.3760 |
| $C_7F_8$ | Perfluoro toluene | | [2] 103 | 1.660 | 1.3664 |

[1] Mixture of ortho-, meta- and para-isomers.
[2] At 740 mm. Hg.

Owing to the character of the conventional solvents, the economy of extraction processes using such solvents is most favorable when relatively small amounts of components poor in hydrogen are to be removed from the initial material. This is the case, for example, in the selective solvent refining of mineral oils, where the extract is a more or less worthless by-product, or in the production of drying oil fractions with high iodine number from fatty oils.

In many cases, however, the components richest in hydrogen must be removed, which constitute only a small part of the oil. According to the invention, this type of extraction process is carried out with the aid of perfluorinated hydrocarbons.

As previously mentioned, the conditions under which the extraction takes place depend upon the properties of the solvent and the character of the raw material. In many cases the extraction process of the invention can be carried out in the same manner as conventional processes using conventional solvents. On the other hand, the boiling point of some perfluorinated hydrocarbons, for example, perfluoro butane, and others, is so low that the extraction should be effected under pressure or after lowering the temperature. In other cases it may be advantageous to add a second solvent in order to facilitate the formation of two phases at a given extraction temperature. These secondary solvents must be completely miscible with the initial material but must be only partly miscible with the perfluoro hydrocarbon. The optimum extraction temperature and amount of solvent should be determined in each particular case, raw material oils having a very low viscosity index, to extract, by means of a perfluorinated hydrocarbon, components the viscosity of which is the least dependent upon temperature. It is likewise possible to obtain, from normal oil distillates, fractions suitable for particular purposes and having an extremely high viscosity index.

Many mineral oils contain hydrocarbons of a mainly paraffinic character and high melting point. Owing to their presence, the oils solidify at a relatively high temperature and this entails a limitation to the practical usefulness of the oils. In order to fulfil their purpose, the oils must therefore be de-waxed at relatively low temperatures, and in practice this is effected by dilution with a suitable solvent, cooling to temperatures below the desired pour point of the oil, and removal of the crystallized wax by filtration or centrifugation. It has now been found that the chiefly paraffinic components can be extracted by selective extraction with perfluorinated hydrocarbons at temperatures above the pour point of the oil. By thus removing the paraffinic constituents of the oil at ordinary or slightly elevated temperature instead of at a very low temperature, a considerable improvement of the economy of the de-waxing is obtained. The method also has the additional advantage that the two phases to be separated are fluid at the working temperature. The raffinate produced by extraction with perfluorinated hydrocarbons has a considerably lower pour point than that of the initial oil.

The object of the selective extraction of fatty oils with perfluorinated hydrocarbons is to separate the initial oil into fractions having properties which are particularly suitable for different applications. According to the invention, drying oils, such as linseed oil, perilla oil, herring oil, etc., may be improved by selective treatment with a suitable perfluorinated hydrocarbon. An extract which is a concentrate of the saturated glycerides, and a raffinate having a higher iodine number and improved drying ability as compared with the initial oil, are thereby obtained.

In the extraction according to the invention, the perfluorinated hydrocarbon solvent is first contacted with the initial product, which contact may be effected in the usual manner. By reason of the solvent which I employ, the resulting extract phase contains mainly the components relatively rich in hydrogen, while the raffinate phase contains mainly the components relatively poor in hydrogen. The extraction should be effected at a temperature at which the initial product and the solvent are only partially miscible. The two phases are then separated in any suitable manner and the solvent removed by distillation. When a second solvent is to be used, as previously stated, it may be added as a diluent to the initial product prior to the extraction. Examples of a suitable second solvent are aromatic hydrocarbons, chlorinated hydrocarbons, ethers, esters, aldehydes, etc. If desired, the second solvent may be one which is fully miscible with the perfluorinated hydrocarbon solvent at the extraction temperature but which is a better solvent for the initial product than is the latter solvent.

It will be understood that fractions of fluorinated hydrocarbons may be used as the solvent and are here considered as fluorinated hydrocarbons.

The following are examples of the practice of my invention:

*Example I.*—100 grams of hydrogenated redistilled Swedish shale naphtha (boiling range 150–200° C.) were mixed with 100 grams of perfluoro methyl cyclohexane (boiling point 76° C.) in a jacketed separatory funnel. During the experiment, the temperature was kept at 50±0.5° C. by circulating hot water through the jacket of the separatory funnel. After powerful shaking, the two layers were allowed to separate. The lower layer (the extract phase) mainly consisted of perfluoro methyl cyclohexane with some dissolved naphtha, the upper layer (the raffinate phase) of naphtha with a small proportion of solvent. After the two layers had separated, the solvent was distilled off in a column until the thermometer indicated a steam temperature of 100° C. By this means, 11.0 grams of naphtha were obtained from the extract phase and 87.9 grams of naphtha from the raffinate phase. Thus, a loss of 1.1 grams. The figures obtained by analysis of the fractions and the raw material are presented in Table II.

TABLE II

*Extraction of hydrogenated shale naphtha with perfluoro methyl cyclohexane*

| | Refractory Index, $n_D^{20}$ | Dispersion, $n_F - n_C$ | Spec. gr., $d_{20}^{20}$ | Spec. Dispersion, $\dfrac{n_F - n_C}{d}$ | Hydrogen Content, Percent |
|---|---|---|---|---|---|
| Untreated naphtha | 1.4630 | 107.4 | 0.8260 | 130 | 12.62 |
| Extract | 1.4600 | 104.0 | 0.8203 | 127 | 12.78 |
| Raffinate | 1.4644 | 108.1 | 0.8274 | 131 | 12.51 |

It will be seen from the table that the hydrocarbon components extracted with this solvent show lower refraction, dispersion, and specific gravity but higher hydrogen content than both the raw naphtha and the raffinate. The undissolved naphtha (the raffinate) has higher refraction, dispersion, and specific gravity but lower content of hydrogen than the raw material.

*Example II.*—100 grams of the same shale naphtha as that used in Example I were extracted at 20° C. with 100 grams of perfluoro pentane. After separation of the phases formed and distillation of the solvent, 7.9 grams of extract and 91.3 grams of raffinate were obtained. Thus, the loss was 0.8 gram. The analysis data of the fractions produced are recorded in Table III.

TABLE III

*Extraction of hydrogenated shale naphtha with perfluoro pentane*

| | Refractory Index, $n_D^{20}$ | Dispersion, $n_F - n_C$ | Spec. gr., $d_{20}^{20}$ | Spec. Dispersion, $\dfrac{n_F - n_C}{d}$ | Hydrogen Content, Percent |
|---|---|---|---|---|---|
| Untreated naphtha | 1.4630 | 107.4 | 0.8260 | 130 | 12.62 |
| Extract | 1.4580 | 98.4 | 0.8181 | 120 | 12.95 |
| Raffinate | 1.4642 | 108.3 | 0.8276 | 131 | 12.49 |

Also in this case in extract having low refraction, dispersion and specific gravity but high hydrogen content is obtained. When using perfluoro pentane in the extraction, the difference between the properties of the extract and the raffinate is greater than when using perfluoro methyl cyclohexane, which shows that the first-mentioned compound is the most selective.

*Example III.*—A medium de-waxed Iraq oil having a viscosity of 109.2 cSt at 50° C. was extracted in the continuous process with perfluoro methyl cyclohexane at 65° C. After the solvent had been saturated with dissolved oil components it was drawn off through an overflow pipe, distilled and returned to the extraction apparatus. During the extraction process the oil was separated into the fractions given in Table IV.

TABLE IV

*Extraction of Iraq-oil with perfluoro methyl cyclohexane*

| Fraction No. | Yield, percent | Hydrogen Content, Percent | Viscosity Index |
|---|---|---|---|
| Raw oil | 100.0 | 13.03 | 95 |
| Extract I | 16.0 | 13.23 | 110 |
| Extract II | 14.2 | 13.17 | 103 |
| Extract III | 9.7 | 13.05 | 91 |
| Residue | 60.1 | 12.82 | 90 |

As may be seen from the table, chiefly components with high hydrogen content and high viscosity index were extracted by the per-fluorinated hydrocarbon.

*Example IV.*—A light paraffin-bearing spindle oil fraction having a pour point +27° C. was diluted with 300% methylene chloride and chilled to —25° C. The mixture was filtered in a cold state and the filter cake washed with 400% methylene chloride chilled to —25° C. After distilling off the solvent, 8.7% paraffin with a melting point of 42° C. and 91.3% oil having a pour point of —20° C. were obtained.

The identical oil was extracted with 1500% perfluoro dimethyl cyclohexane at 90° C. After separating the phases and distilling off the solvent, 92.0% raffinate with a pour point of 21° C. and 8% extract were obtained. The extract and the raffinate were dewaxed with methylene chloride, as described above. The extract contained 24.3% paraffin with a melting point of 43.5° C. and the raffinate 7.55% paraffin having a melting point of 42° C. Thus, a concentration of the paraffin in the extract phase has taken place.

*Example V.*—A herring oil with an iodine number of 158 was extracted with 2000% perfluoro methyl cyclohexane at 65° C. After separating the phases and distilling off the solvent, 9.7% extract with iodine number 27 and 90.3% raffinate with iodine number 172 were obtained. Thus, the extract consists mainly of saturated glycerides, whereas the unsaturated glycerides have been concentrated in the raffinate.

I claim:

1. A process for extracting components relatively rich in hydrogen from mineral oils and fatty oils, which comprises contacting the oil with a perfluorinated hydrocarbon having at least three carbon atoms in the molecule, as a solvent, to produce a raffinate phase containing mainly the components relatively poor in hydrogen and an extract phase containing mainly the components relatively rich in hydrogen, at a temperature at which the oil and solvent are only partly miscible, the solvent extraction being effected in the presence of a second solvent which, at the extraction temperature, is miscible with said oil but is only partially miscible with said first solvent, and separating the two phases.

2. A process for extracting components relatively rich in hydrogen from mineral oils and fatty oils, which comprises contacting the oil with a perfluorinated hydrocarbon having at least three carbon atoms in the molecule, as a solvent, to produce a raffinate phase containing mainly the components relatively poor in hydrogen and an extract phase containing mainly the components relatively rich in hydrogen, at a temperature at which the oil and solvent are only partly miscible, the solvent extraction being effected in the presence of a second solvent which is fully miscible with said first solvent at the extraction temperature and which is a better solvent for said oil than is the first solvent, and separating the two phases.

BEN BRAAE.

References Cited in the file of this patent

UNITED STATES PATENTS

| Number | Name | Date |
|---|---|---|
| 2,162,682 | Terres et al. | June 13, 1939 |
| 2,200,391 | Freeman | May 14, 1940 |
| 2,279,408 | McDonald | Apr. 14, 1942 |
| 2,582,197 | Egan | Jan. 8, 1952 |

FOREIGN PATENTS

| Number | Country | Date |
|---|---|---|
| 475,723 | Great Britain | Nov. 22, 1937 |